United States Patent
Hosseini et al.

(12) United States Patent (10) Patent No.: US 10,931,430 B2
Hosseini et al. (45) Date of Patent: Feb. 23, 2021

(54) UPLINK PREEMPTION IN CARRIER AGGREGATION/MULTI-CONNECTIVITY MODE

(71) Applicant: QUALCOMM Incorporated, San Diego, CA (US)

(72) Inventors: Seyedkianoush Hosseini, San Diego, CA (US); Amir Aminzadeh Gohari, Sunnyvale, CA (US); Peter Gaal, San Diego, CA (US); Wanshi Chen, San Diego, CA (US); Chih-Ping Li, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 16/283,246

(22) Filed: Feb. 22, 2019

(65) Prior Publication Data
US 2019/0268127 A1 Aug. 29, 2019

Related U.S. Application Data

(60) Provisional application No. 62/634,886, filed on Feb. 25, 2018.

(51) Int. Cl.
*H04W 76/36* (2018.01)
*H04L 5/00* (2006.01)
*H04W 72/12* (2009.01)

(52) U.S. Cl.
CPC ............ *H04L 5/0098* (2013.01); *H04L 5/001* (2013.01); *H04L 5/0037* (2013.01);
(Continued)

(58) Field of Classification Search
CPC ..... H04L 5/0098; H04L 5/001; H04L 5/0037; H04L 5/0042; H04L 5/0044;
(Continued)

(56) References Cited

U.S. PATENT DOCUMENTS

2018/0035459 A1* 2/2018 Islam .................... H04L 5/0096
2019/0098612 A1* 3/2019 Babaei ................ H04W 72/042
(Continued)

OTHER PUBLICATIONS

Apple Inc: "Discussion on Handling of UL Multiplexing of Transmissions with Different Reliability", 3GPP Draft; R1-1802289 Discussion on Handling of UL Multiplexing of Transmissions With Different Reliability Requirement, 3rd Generation Partnership Project (3GPP), Mobile Competence Centre; 650, Rou, vol. RAN WG1, No. Athens, Greece; Feb. 26, 2018-Mar. 2, 2018, Feb. 17, 2018 (Feb. 17, 2018), XP051397819, 5 Pages, Retrieved from the Internet: URL:http://www.3gpp.org/ftp/tsg%5Fran/WG1%5FRL1/TSGR1%5F92/Docs/ [retrieved on Feb. 17, 2018].
(Continued)

*Primary Examiner* — Kodzovi Acolatse
(74) *Attorney, Agent, or Firm* — Patterson + Sheridan, LLP

(57) ABSTRACT

Certain aspects of the present disclosure relate to uplink preemption in certain systems, such as new radio (NR) systems, supporting carrier aggregation (CA) and/or multi-connectivity modes. A method for wireless communication, that can be performed by a user equipment (UE), generally includes receiving a resource assignment scheduling the UE for uplink transmission. The UE receives an indication to preempt uplink transmission on a portion of the assigned resources and determines whether to transmit on the remaining assigned resources. A method that can be performed by a base station (BS) generally includes receiving an indication from one or more UEs indicating, for each of a plurality of band combinations, a capability of the UE to transmit on
(Continued)

a band when transmission on another band in the band combination is preempted and scheduling the one or more UEs for uplink transmission based on the indication.

26 Claims, 12 Drawing Sheets

(52) U.S. Cl.
CPC .......... *H04L 5/0042* (2013.01); *H04L 5/0044* (2013.01); *H04L 5/0053* (2013.01); *H04L 5/0087* (2013.01); *H04L 5/0094* (2013.01); *H04W 72/1268* (2013.01); *H04W 76/36* (2018.02)

(58) Field of Classification Search
CPC ... H04L 5/0053; H04L 5/0087; H04L 5/0094; H04W 76/36; H04W 72/1268
See application file for complete search history.

(56) References Cited

U.S. PATENT DOCUMENTS

| | | | |
|---|---|---|---|
| 2019/0357264 A1* | 11/2019 | Yi | H04L 27/2602 |
| 2020/0022160 A1* | 1/2020 | Zou | H04W 72/1268 |
| 2020/0053698 A1* | 2/2020 | Chen | H04W 72/04 |

OTHER PUBLICATIONS

International Search Report and Written Opinion—PCT/US2019/019339—ISA/EPO—dated May 17, 2019.
LG Electronics: "Discussion on Multiplexing UL Transmission With Different Requirements", 3GPP Draft; R1-1802228 Discussion on Multiplexing UL Transmission With Different Requirements, 3rd Generation Partnership Project (3GPP). Mobile Competence Centre, 650, Route Des Lucioles, F-06921 S, vol. RAN WG1, No. Athens, Greece; Feb. 26, 2018-Mar. 2, 2018, Feb. 16, 2018 (Feb. 16, 2018), XP051397233, 6 Pages, Retrieved from the Internet: URL:http://www.3gpp.org/ftp/tsg%5Fran/WG1%5FRL1/TSGR1%5F92/Docs/ [retrieved on Feb. 16, 2018], sec.3; p. 3-p. 4.
Qualcomm Incorporated: "eMBB and URLLC Dynamic Multiplexing and Preemption Indication on the Uplink", 3GPP Draft; R1-1802854 EMBB and URLLC Dynamic Multiplexing and Preemption Indication on the Uplink, 3rd Generation Partnership Project (3GPP), Mobile Competence Centre ; 650, Route Des Lucioles ; F-06, vol. RAN WG1, No. Athens, Greece; Feb. 26, 2018-Mar. 2, 2018, Feb. 17, 2018 (Feb. 17, 2018), XP051398267, 8 Pages, Retrieved from the Internet: URL:http://www.3gpp.org/ftp/tsg%5Fran/WG1%5FRL1/TSGR1%5F92/Docs/ [retrieved on Feb. 17, 2018].
Qualcomm Incorporated: "NR Features and Capabilities" 3GPP Draft; R1-1802849 NR Features and Capabilities, 3rd Generation Partnership Project (3GPP), Mobile Competence Centre; 650, Route Des Lucioles ; F-06921 Sophia-Antipolis Cedex ; France, vol. RAN WG1, No. Athens, Greece; Feb. 26, 2018- Mar. 2, 2018, Feb. 17, 2018 (Feb. 17, 2018), XP051398262, 8 Pages, Retrieved from the Internet: URL:http://www.3gpp.org/ftp/tsg%5Fran/WG1%5FRL1/TSGR1%5F92/Docs/ [retrieved on Feb. 17, 2018], p. 1-p. 3.
Samsung: "Multiplexing of UL Transmissions with Different Reliability Requirements", 3GPP Draft; R1-1802002—Multiplexing of UL Transmissions with Different Reliability Requirements, 3rd Generation Partnership Project (3GPP), Mobile Competence Centre ; 650, Route Des Lucioles ; F-069, vol. RAN WG1, No. Athens, Greece; Feb. 26, 2018-Mar. 2, 2018, Feb. 16, 2018 (Feb. 16, 2018),XP051397111, 7 Pages, Retrieved from the Internet: URL:http://www.3gpp.org/ftp/tsg%5Fran/WG1%5FRL1/TSGR1%5F92/Docs/ [retrieved on Feb. 16, 2018].
Vivo: "Multiplexing Data with Different Transmission Durations", 3GPP Draft, R1-1800205, 3GPP TSG RAN WG1 Meeting AH 1801, 3rd Generation Partnership Project (3GPP), Mobile Competence Centre ; 650, Route Des Lucioles ; F-06921 Sophia-Antipolis, vol. RAN WG1, No. Vancouver, Canada, Jan. 22-26, 2018, Jan. 13, 2018 (Jan. 13, 2018-01-13, 6 Pages, XP051384694, Retrieved from the Internet: URL: http://www.3gpp.org/ftp/tsg_ran/WG1_RL1/TSGR1_AH/NR_AH_1801/Docs/ and URL:http://www.3gpp.org/ftp/tsg_ran/WG1_RL1/TSGR1_AH/NR_AH_1801/Docs/ [retrieved on Jan. 13, 2018] Section 3.1, p. 1-p. 2.

* cited by examiner

UPLINK PREEMPTION IN CARRIER AGGREGATION/MULTI-CONNECTIVITY MODE

CROSS-REFERENCE TO RELATED APPLICATION & PRIORITY CLAIM

This application claims benefit of and priority to U.S. Provisional Patent Application Ser. No. 62/634,886, filed Feb. 25, 2018, herein incorporated by reference in its entirety as if fully set forth below and for all applicable purposes.

BACKGROUND

Field of the Disclosure

Aspects of the present disclosure relate to wireless communications, and more particularly, to techniques for wireless communication including, for example, uplink preemption handling for certain systems, such as new radio (NR) systems supporting carrier aggregation (CA) and/or multi-connectivity modes.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure relate to uplink preemption for certain systems, such as new radio (NR) systems supporting carrier aggregation (CA) and/or multi-connectivity modes.

Certain aspects provide a method for wireless communication that can be performed by a user equipment (UE). The method generally includes receiving a resource assignment scheduling the UE for uplink transmission. The method generally includes receiving an indication to preempt uplink transmission on a portion of the assigned resources. The method generally includes determining whether to transmit on the remaining assigned resources.

performed by a base station (BS). The method generally includes receiving an indication from one or more UEs indicating, for each of a plurality of band combinations, a capability of the UE to transmit on a band when transmission on another band in the band combination is preempted. The method generally includes scheduling the one or more UEs for uplink transmission based on the indication.

Certain aspects provide an apparatus for wireless communication such as a UE. The apparatus generally includes means for receiving a resource assignment scheduling the apparatus for uplink transmission. The apparatus generally includes means for receiving an indication to preempt uplink transmission on a portion of the assigned resources. The apparatus generally includes means for determining whether to transmit on the remaining assigned resources.

Certain aspects provide an apparatus for wireless communication such as a BS. The apparatus generally includes means for receiving an indication from one or more UEs indicating, for each of a plurality of band combinations, a capability of the UE to transmit on a band when transmission on another band in the band combination is preempted. The apparatus includes generally means for scheduling the one or more UEs for uplink transmission based on the indication.

Certain aspects provide an apparatus for wireless communication such as a UE. The apparatus generally includes a receiver configured to receive a resource assignment scheduling the apparatus for uplink transmission and to receive an indication to preempt uplink transmission on a portion of the assigned resources. The apparatus generally includes at least one processor coupled with a memory and configured to determine whether to transmit on the remaining assigned resources.

Certain aspects provide an apparatus for wireless communication such as a BS. The apparatus generally includes a receiver configured to receive an indication from one or more UEs indicating, for each of a plurality of band combinations, a capability of the UE to transmit on a band when transmission on another band in the band combination is preempted. The apparatus generally includes at least one processor coupled with a memory and configured to schedule the one or more UEs for uplink transmission based on the indication.

Certain aspects provide a computer readable medium having computer executable code stored thereon for wireless communication. The computer executable code generally includes code for receiving a resource assignment scheduling a UE for uplink transmission. The computer executable code generally includes code for receiving an indication to preempt uplink transmission on a portion of the assigned resources. The computer executable code generally includes code for determining whether to transmit on the remaining assigned resources.

Certain aspects provide a computer readable medium having computer executable code stored thereon for wireless communication. The computer executable code generally includes code for receiving an indication from one or more UEs indicating, for each of a plurality of band combinations, a capability of the UE to transmit on a band when transmission on another band in the band combination is preempted. The computer executable code generally includes code for scheduling the one or more UEs for uplink transmission based on the indication.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
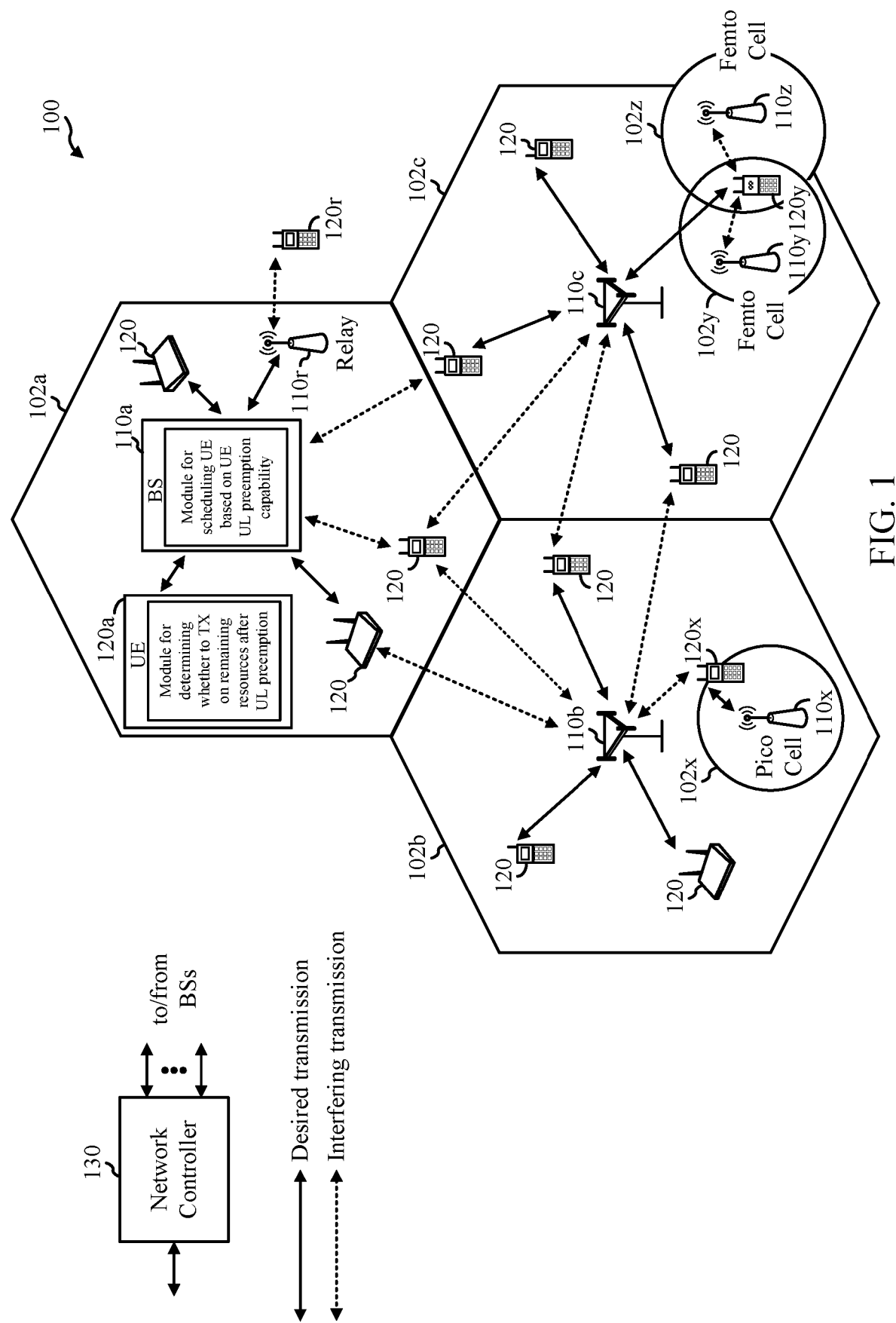
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G NR technology). NR may support various wireless communication services, such as enhanced mobile broadband (eMBB) targeting wide bandwidth (e.g. 80 MHz or beyond), millimeter wave (mmW) targeting high carrier frequency (e.g. 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Due to the different scheduling timelines for different services, resources allocated for a service may be used for (e.g., preempted by) a different services. In some examples, due to the high latency requirements for URLLC, a URLLC transmission may preempt an eMBB allocation.

Aspects of the present disclosure provide methods and apparatus for uplink preemption handling for certain systems, such as NR, that supports carrier aggregation (CA) and/or multi-connectivity modes. The techniques described herein may provide for handling of transmissions on other carriers, cells, and/or in other symbols when preemption occurs in another carrier, cell, or symbol.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless communication network 100 may be a New Radio (NR) or 5G network. The wireless communication network 100 may support carrier aggregation (CA) and/or multi-connectivity modes, such as dual-connectivity (DC) modes.

As illustrated in FIG. 1, the wireless communication network 100 may include a number of BSs 110 and other network entities. A BS may be a station that communicates with user equipment (UEs) 120. A UE 120a in the wireless communication network 100 may be allocated resources (e.g., scheduled), by a BS 110a, for a transmission for a particular type of service. The UE 120a, or another UE 120, may be allocated resources for another transmission for another service using at least some of the time-frequency resources allocated for the first transmission. Thus, the BS 110a can indicate to the UEs 120a to preempt transmission on the overlapping resources. Based on the indication, the UE 120a determines to drop the transmission on the overlapping allocated time-frequency resources. The UE 120a also determines whether to send or drop transmissions on other time-frequency resources, such as other carriers or symbols. As shown in FIG. 1, the UE 120a has a module configured for determining whether to transmit on remaining resources after uplink preemption, in accordance with aspects of the present disclosure. As described in more detail below, the determination of whether to send or drop transmissions on other time-frequency resources may be based on various scenarios/factors. The BS 110a may receive an indication from the UE 120a of band combinations and for each band, whether the UE 120a is capable of transmitting on other bands, when one of the bands is preempted. As shown in FIG. 1, the BS 110a has a module configured for scheduling the UE based on the indication.

Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). ABS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
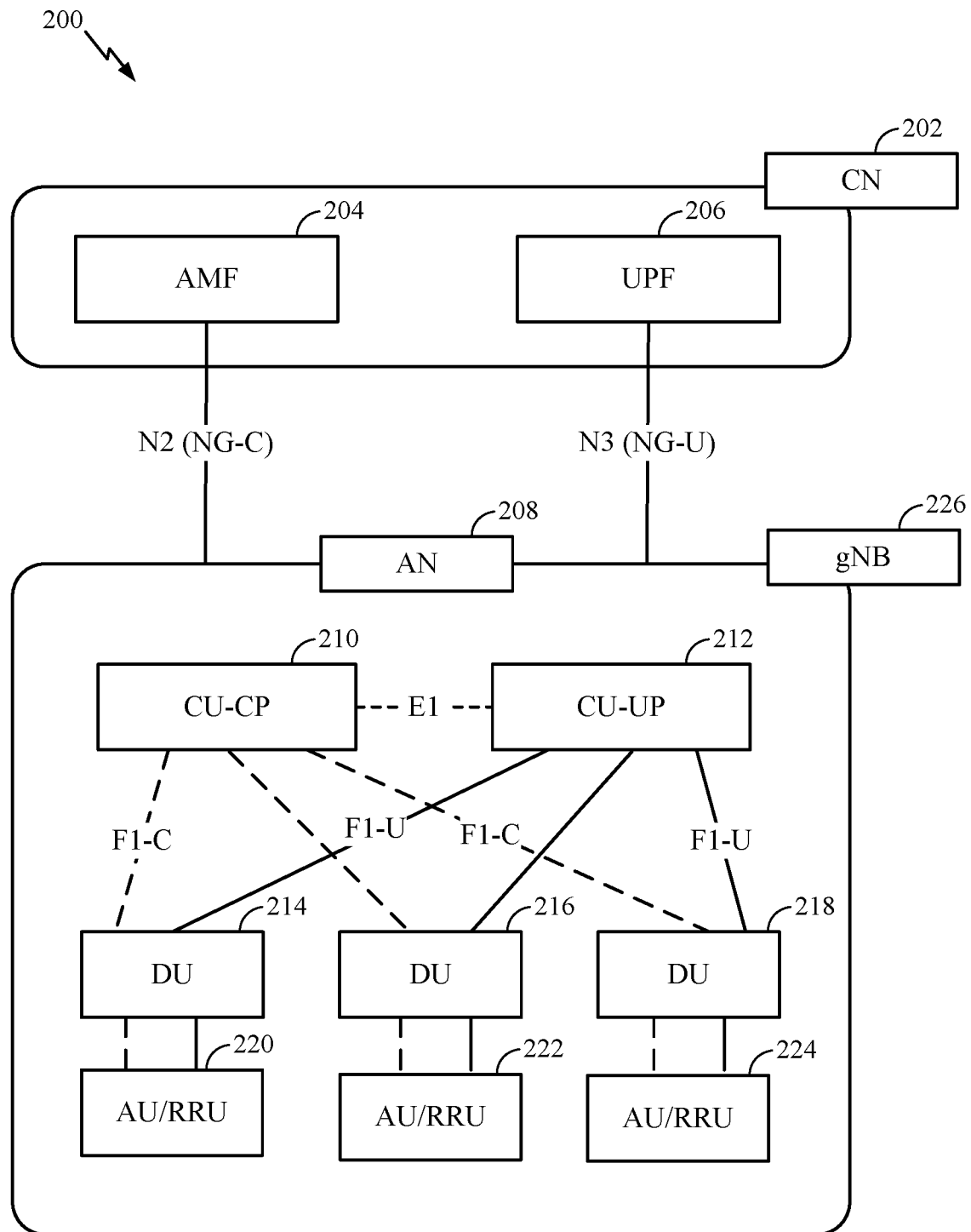
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1.

As shown in FIG. 2, the distributed RAN includes Core Network (CN) 202 and Access Node 208. The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions. The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
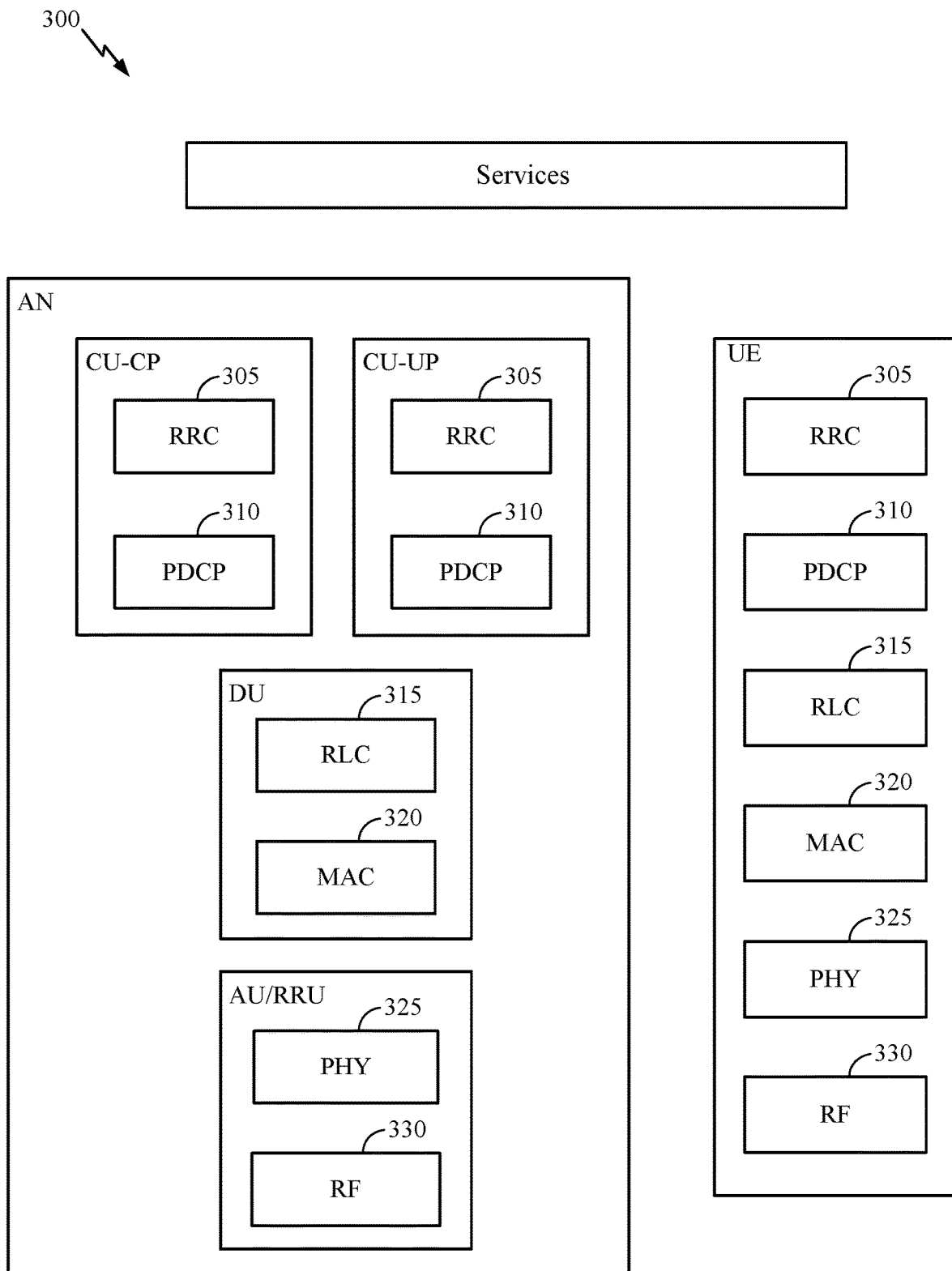
FIG. 3 is a block diagram showing examples for implementing a communication protocol stack in the example RAN architecture, in accordance with certain aspects of the present disclosure.

The system may support various services over one or more protocols. FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
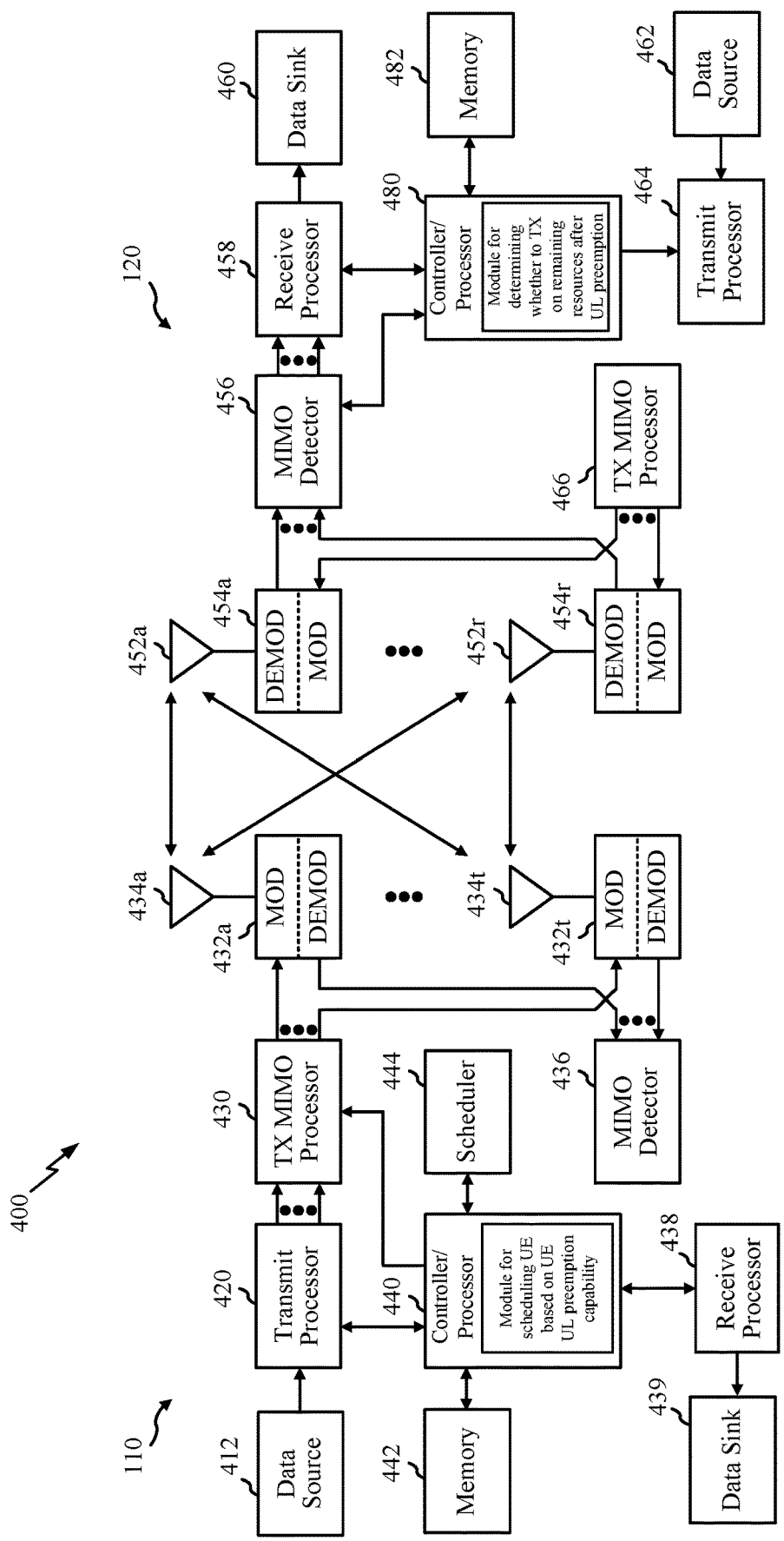
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein. For example, as shown in FIG. 4, the controller/processor 480 has a module for determining whether to transmit on remaining resources after uplink preemption and the controller/processor 440 has a module for scheduling the UE based on the UE uplink preemption capability.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
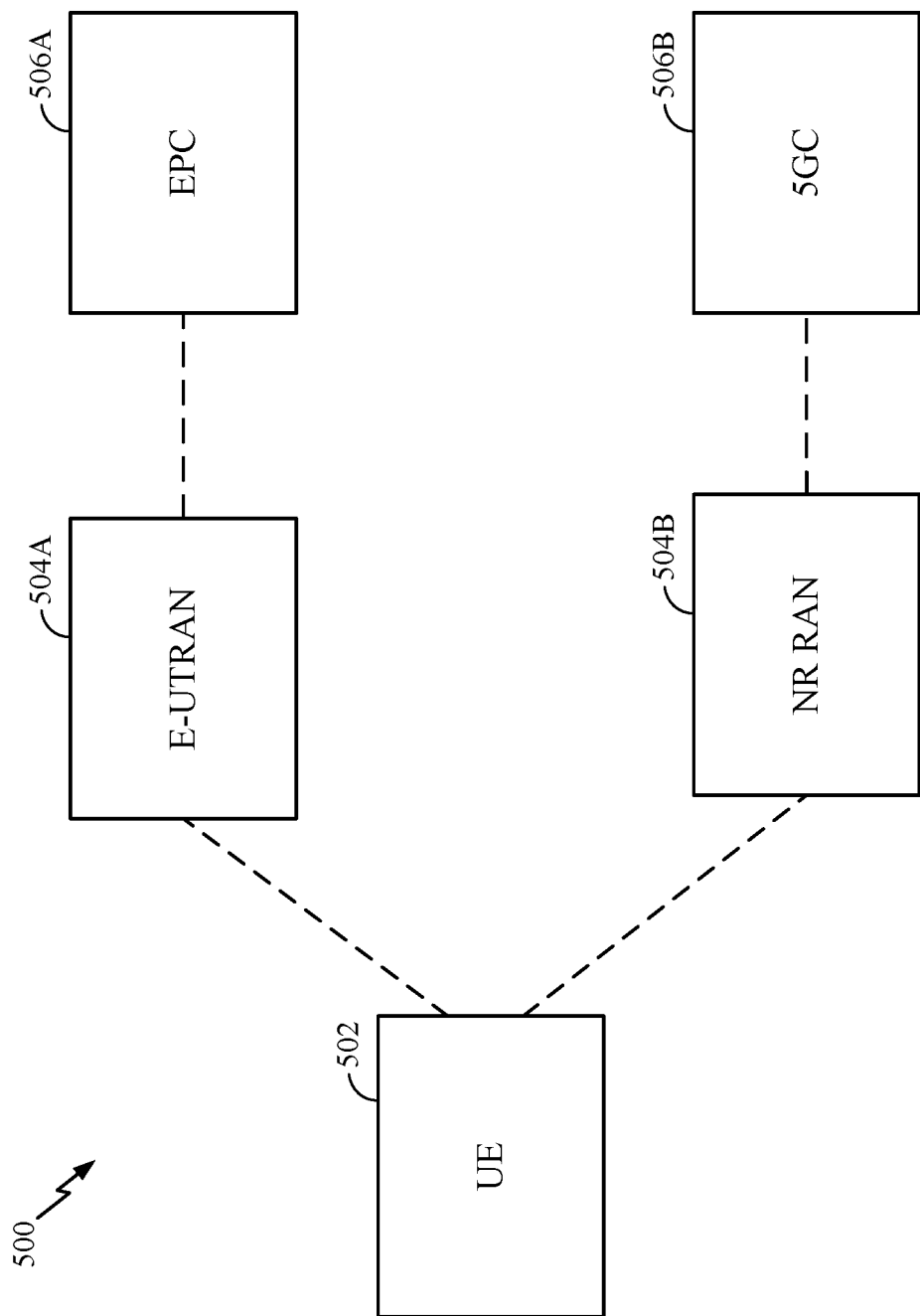
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
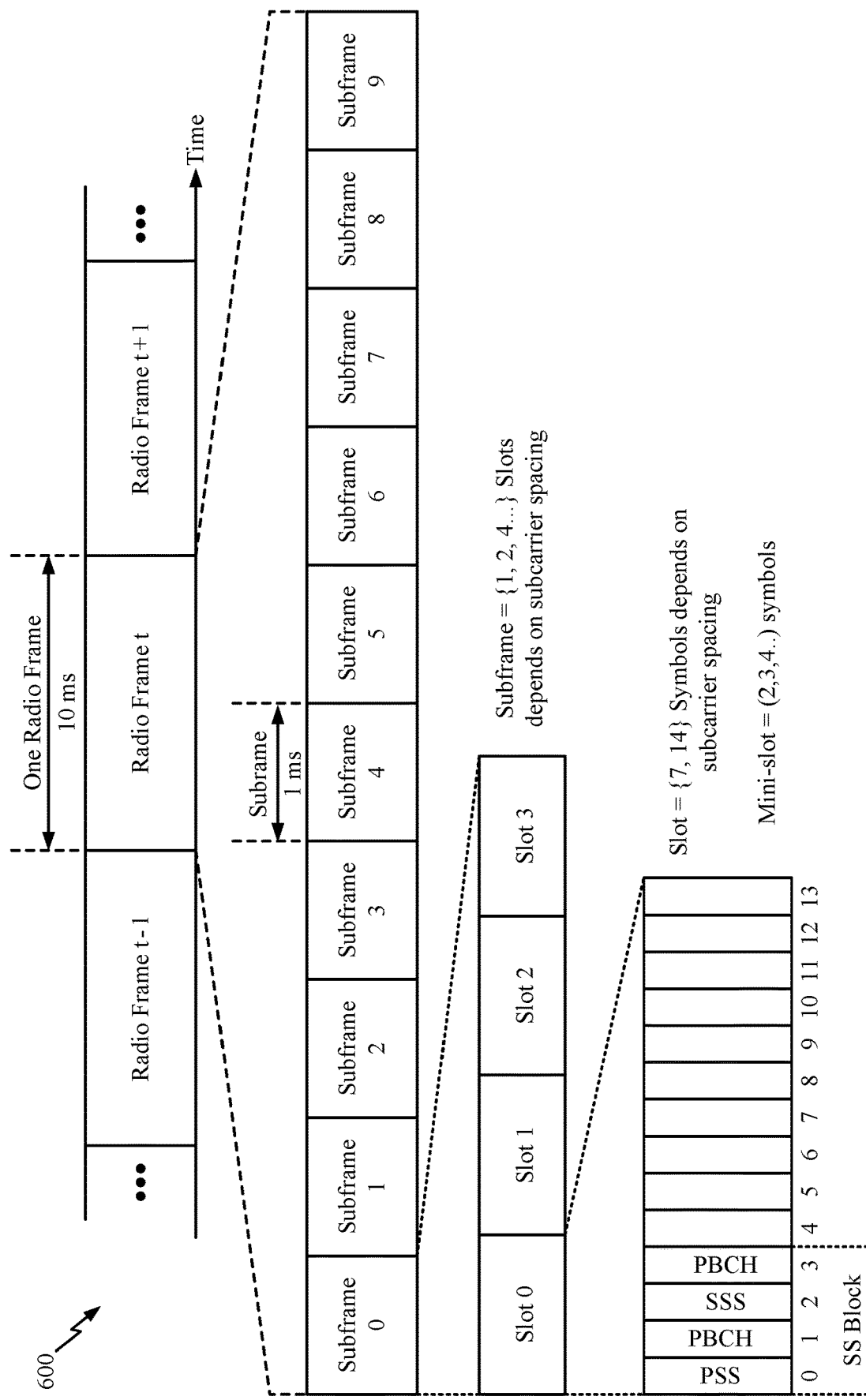
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UEto-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Carrier Aggregation and Multi-Connectivity

Figure 7:
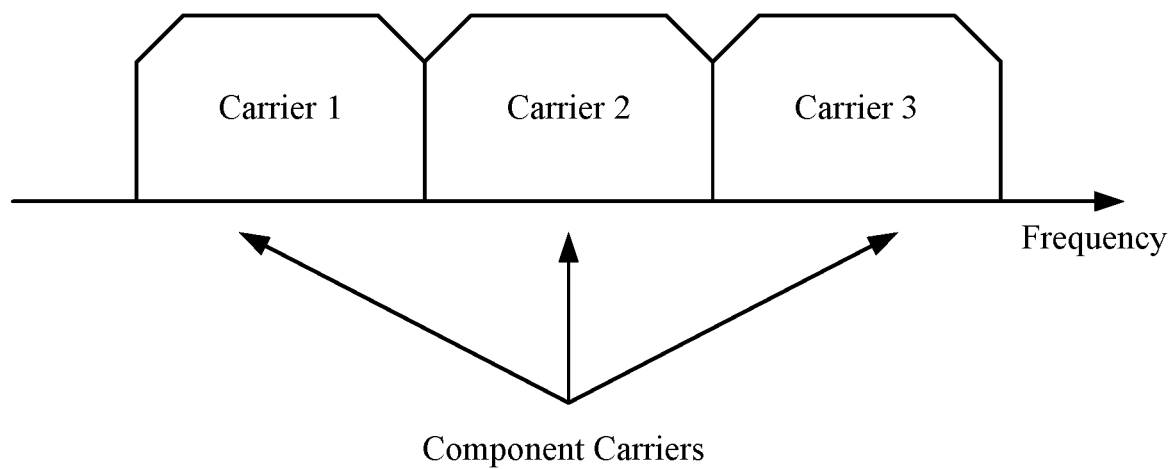
FIG. 7 illustrates an example contiguous carrier aggregation type, in accordance with certain aspects of the present disclosure.
Figure 8:
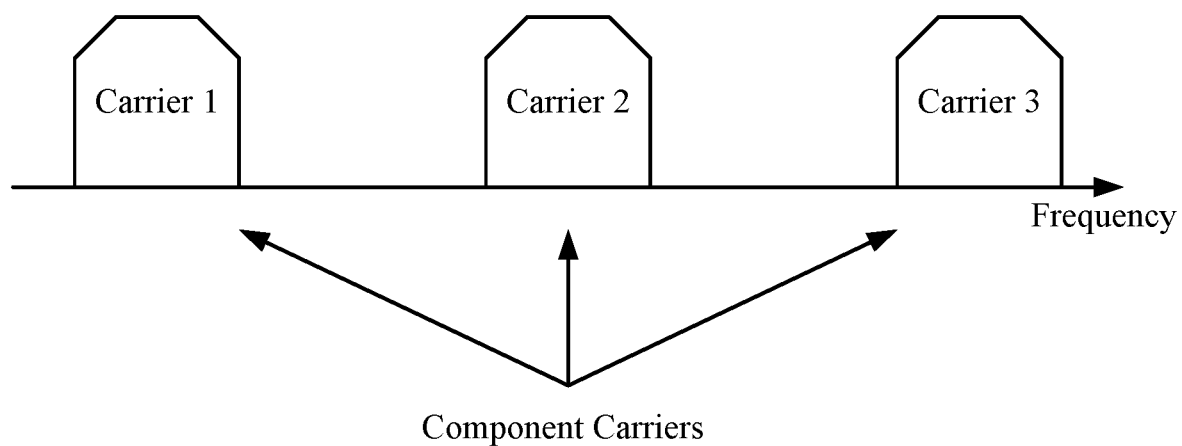
FIG. 8 illustrates an example non-contiguous carrier aggregation type, in accordance with certain aspects of the present disclosure.

In certain systems, such as NR, carrier aggregation (CA) is supported. In some examples, UEs may use spectrum of up to 20 MHz bandwidths allocated for a carrier up to a total of 100 MHz (5 CCs) for transmission in each direction. Two types of carrier aggregation include contiguous CA and non-contiguous CA. In contiguous CA, multiple available CCs are adjacent to each other as shown in FIG. 7. In non-contiguous CA multiple available CCs are separated along the frequency band as shown in FIG. 8. Both non-contiguous and contiguous CA aggregate multiple CCs to serve a single UE.

In some cases, a UE operating in a multicarrier system (e.g., a system supporting CA) can be configured to aggregate certain functions of multiple carriers, such as control and feedback functions, on a single carrier, which may be referred to as the primary component carrier (PCC). The remaining associated carriers that depend on the PCC for support are referred to as the secondary component carriers (SCC).

In certain systems, such as NR, multi-connectivity, such as dual connectivity (DC), is supported. In DC mode, a UE can be connected to two BSs (or more for multi-connectivity scenarios). The BSs may operate on different CCs and/or in different RATs (e.g., one in LTE and in NR). The BSs may be referred to as a master cell and secondary cells.

Example Uplink Preemption in CA and/or Multi-Connectivity Mode

Aspects of the present disclosure provide apparatus, methods, processing systems, and computer readable mediums for NR (new radio access technology or 5G NR technology). NR may support various wireless communication services, such as enhanced mobile broadband (eMBB) targeting wide bandwidth (e.g. 80 MHz or beyond), millimeter wave (mmW) targeting high carrier frequency (e.g. 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Figure 9:
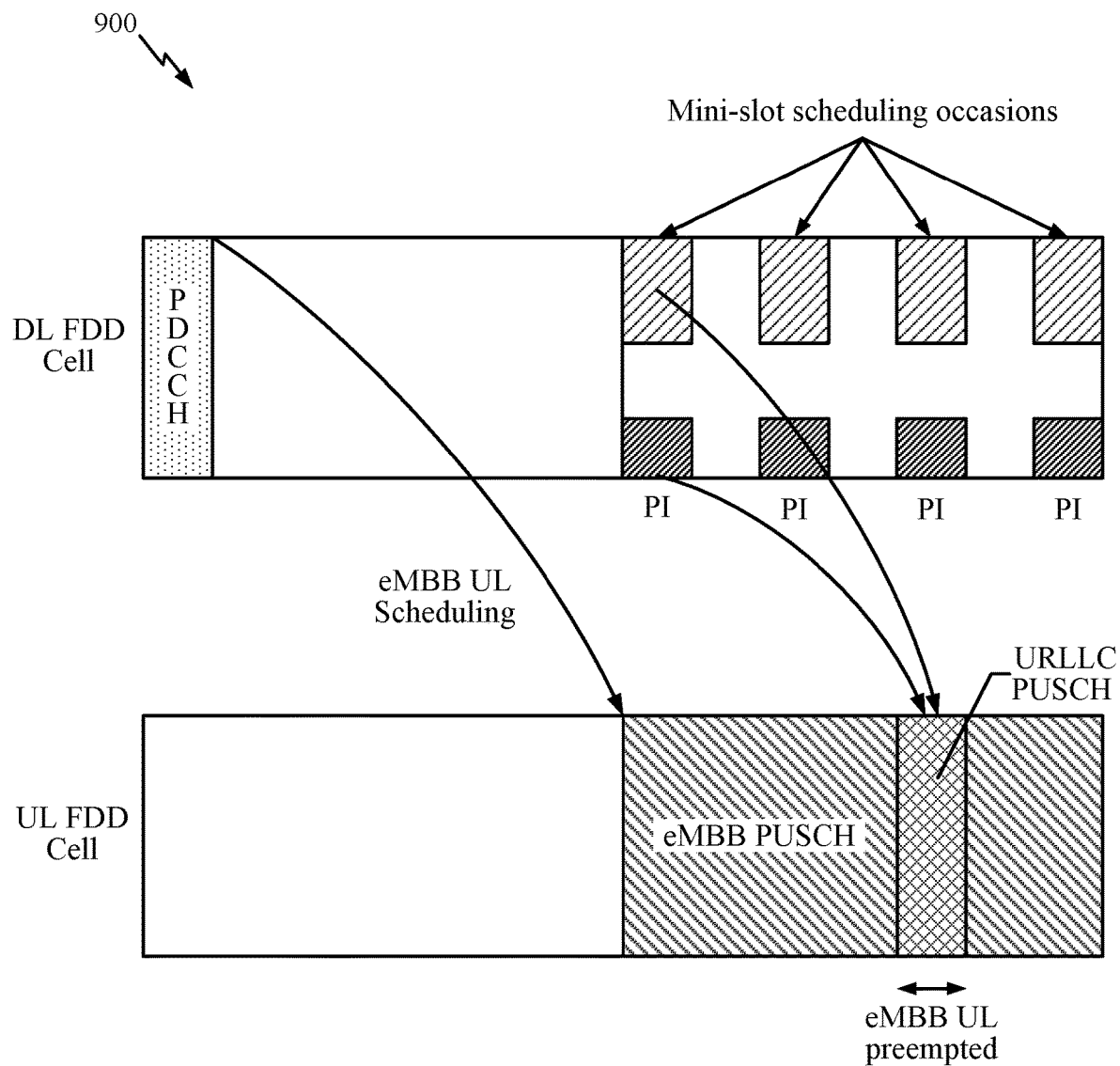
FIG. 9 illustrates an example of uplink preemption, in accordance with certain aspects of the present disclosure.

The different services may have different scheduling timelines. In that case, resources allocated for a service may be used for (e.g., preempted by) a different service. In some examples, due to the high latency requirements for URLLC service (e.g., 1 ms), a URLLC transmission may preempt an eMBB allocation. FIG. 9 illustrates preemption for overlapping transmissions. As shown in FIG. 9, a first user equipment (UE) may be scheduled for an eMBB uplink transmission, for example, by a downlink control information (DCI) in the physical downlink control channel (PDCCH). As shown in FIG. 9, a second UE can be scheduled, for example in a later mini-slot scheduling occasion, for a ULRLLC PUSCH transmission that overlaps with the scheduled eMBB PUSCH transmission for the other UE. The eMBB PUSCH transmission can be preempted by the URLLC PUSCH transmission in at least the overlapping symbol(s). In other words, the eMBB PUSCH transmission by the first UE is suspended during the at least the duration of the URLLC transmission by the second UE.

In some examples, when preemption occurs during the overlapping resources, the UE that suspends its transmission (i.e., the first UE in the example above) may resume transmission on subsequent resources or the UE may drop the transmission on some or all of the subsequent resources as well. In some examples, the determination of whether to transmit or drop on the other resources can be based on whether the UE can maintain phase continuity. For example, in the case of a single component carrier (CC), when the UE is capable of maintaining phase continuity when an uplink transmission on the CC is preempted (e.g., dropped) in one or more symbols, the UE may resume the uplink transmission in the following symbols. When the UE cannot maintain phase continuity, in some cases, the UE transmits in all of the remaining symbols of the uplink transmission, or the UE transmits in a portion of the symbols, or the UE drops the uplink transmission in all the remaining symbols.

As mentioned above, certain systems (e.g., such as the wireless communication network 100) support carrier aggregation (CA) and/or multi-connectivity (e.g., dual-connectivity (DC) mode), in which multiple CCs can be aggregated to serve a device, for example, the UE for uplink. In this case, preempting transmission on one CC may affect whether the UE can transmit on the other CCs in the preempted symbol(s) and the subsequent symbols.

Aspects of the present disclosure provide techniques and apparatus for uplink preemption handling for certain systems, such as NR, that support CA and/or DC modes. The techniques described herein may provide for handling of transmissions on other carriers, cells, and/or in other symbols when preemption occurs in another carrier, cell, or symbol.

Figure 10:
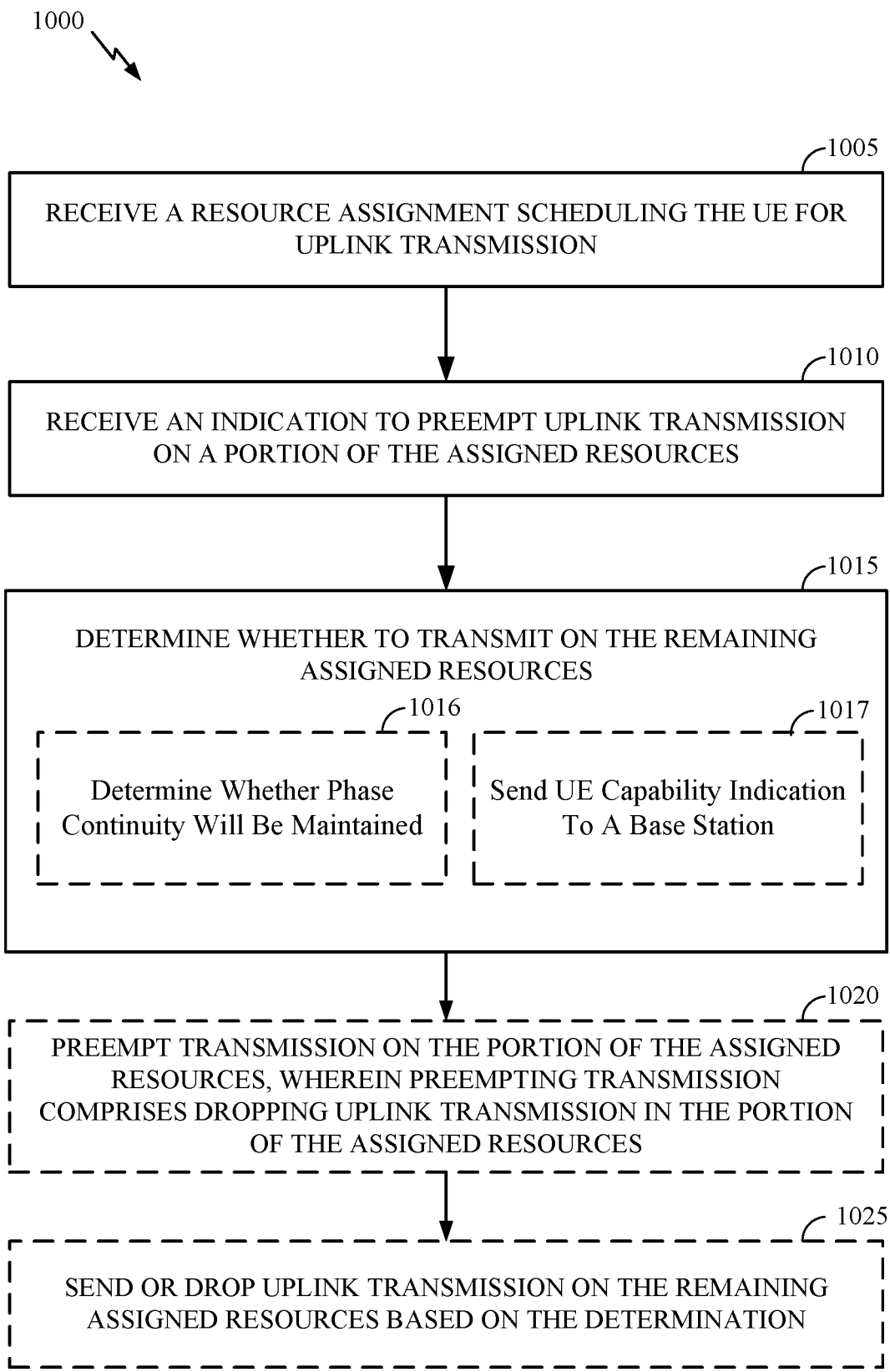
FIG. 10 is a flow diagram illustrating example operations for wireless communications by a transmitting device, in accordance with aspects of the present disclosure.

FIG. 10 illustrates example operations 1000 for wireless communications by a UE (e.g., such as a UE 120 in the wireless communication network 100), in accordance with certain aspects of the present disclosure. Operations 1000 may be implemented as software components that are executed and run on one or more processors (e.g., processor 480 of FIG. 4). Further, the transmission and reception of signals by the UE in operations 1000 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

Operations 1000 begin, at 1005, by receiving a resource assignment scheduling the UE for uplink transmission. For example, the UE may be scheduled for a URLLC PUSCH transmission and/or an eMBB PUSCH transmission one or more CCs in one or more symbols.

At 1010, the UE receives an indication to preempt uplink transmission on a portion of the assigned resources. For example, the indication may indicate to preempt transmission in one or more symbols (e.g., within a slot or slots) and on one or more CCs (e.g., at least one CC).

At 1015, the UE determines whether to transmit on the remaining assigned resources. For example, the UE determines whether to transmit or drop the scheduled uplink transmission(s) on other CCs and/or in subsequent symbols and/or slots than the preempted transmission.

The determination, at 1015, of whether to transmit or drop uplink transmission on the remaining assigned resources may be based on whether phase continuity will be maintained between the CCs after the preemption. For example, at 1016, the UE may determine whether phase continuity will be maintained when the UE transmits on the other assigned resources after the preemption. In some examples, whether phase continuity will be maintained may be based on UE-capability. In some examples, whether phase continuity will be maintained may be based on whether the other CCs are inter-band, inter-band, contiguous, and/or non-contiguous with the preempted CC(s).

Power changes may lead to phase discontinuity. In some examples, a UE uses a single radio frequency (RF) chain for intra-band contiguous CCs. Thus, when another CC (e.g., CC1) is intra-band and contiguous with the preempted CC (e.g., CC0), the power change (e.g., if the uplink transmission is dropped on CC0 but transmitted on CC1) may lead to phase discontinuity. On the other hand, for inter-band CCs and/or discontiguous CCs, the UE may use multiple RF chains. Thus, when another CC is inter-band and/or another CC (e.g., CC2) is contiguous with the preempted CC (e.g., CC0), then power change may not be incurred and, therefore, phase continuity can be preserved. Therefore, the determination at 1015 may include determining to drop uplink transmission in the at least one symbol (i.e., the preempted symbol) on another CC when the at least one CC (i.e., the preempted CC) and the other CC are intra-band and frequency contiguous (i.e., phase continuity would not be preserved). Or, the determination at 1015 may include determining to send uplink transmission in the at least one symbol on the other CC when the other CC is frequency non-contiguous and/or inter-band (i.e., if phase continuity will be preserved).

According to certain aspects, the UE can provide, at 1017, an indication to the BS of the capability of the UE to transmit on the one or more other CCs when the at least one CC is preempted. For example, the UE can report its capability per band and/or per band combination. If supported, the UE may transmit uplink on another CC even when a CC is preempted. If transmission is not supported, the other CC will also be preempted (e.g. uplink transmission on that CC dropped). In some examples, the decision may apply to all CCs or only some CCs. In some examples, the decision may apply to only the preempted symbol, to all or a portion of the remaining symbols in the slot, and/or to all or a portion of the subsequent slots.

In some examples, when the UE can preserve phase continuity on all CCs after preemption, then transmission can be resumed on all CCs after the preemption. Thus, the determination at block 10015, may include determining to send uplink transmission(s) on the at least one CC and other CCs in the subsequent symbols if phase continuity will be maintained on all of the CCs after the preemption.

In some examples, if the UE can preserve phase continuity on only some CCs after preemption, then transmission on the CCs (e.g., the CCs that were preempted) in the remaining symbols may be either all dropped or all transmitted. Thus, the determination at block 1015, may include determining to send or drop uplink transmission on the at least one CC and other CCs in the other subsequent symbols if phase continuity will be maintained on only some of the CCs after the preemption.

In some examples, if some symbols are preempted on a CC, uplink transmission on that CC in the remaining symbols may always be dropped and uplink transmission in the remaining symbols on any other CC for which the UE may not preserve phase continuity (e.g., as provided in the indication to the BS) are also dropped.

In some examples, if some (e.g., any) symbols are preempted on a CC, uplink transmission on that CC in the remaining symbols may always be resumed and uplink transmission in the remaining symbols on any other CC for which the UE may preserve phase continuity (e.g., as provided in the indication to the BS) are also resumed.

According to certain aspects, the UE may resume transmission (e.g., on the preempted CCs) on remaining symbols (e.g., after the preempted symbol) based on a type of content of the other symbols (i.e., content of uplink transmission scheduled in the other symbols). For example, the determination at block 1015 may also be based on whether the content of the remaining symbols includes demodulation reference signal (DMRS), uplink control information (UCI), and/or a type of UCI (e.g., HARQ ACK/NACK information, channel quality indicator (CQI), precoding matrix indicator (PMI), and/or rank indictor (RI)). In some examples, the UE may resume transmission on remaining symbols only if the remaining symbols include DMRS. The determination may be made independently for each CC if phase continuity can be preserved. For CCs where phase continuity would not be preserved, transmission on both CCs may be either sent or dropped. In an illustrative example, if CC0 has a DMRS and CC1 does not have a DMRS in remaining symbols, and if resuming transmission on CC0 and suspending transmission would lead to phase discontinuity (e.g., if they are intra-band and contiguous), then uplink transmission is sent on both CC0 and CC1 or is dropped for both CC0 and CC1. In another illustrative example, if transmission on CC0 is preempted and the remaining symbols do not have a DMRS on CC0, but the remaining symbols do have a DMRS on CC1, then the UE may transmit the remaining symbols for both CC0 and CC1, even if phase continuity will not be preserved.

At 1020, the UE may preempt transmission on the portion of the assigned resources. Preempting transmission includes dropping uplink transmission in the portion of the assigned resources.

At 1025, the UE may send or drop uplink transmission on the remaining assigned resources based on the determination.

Figure 11:
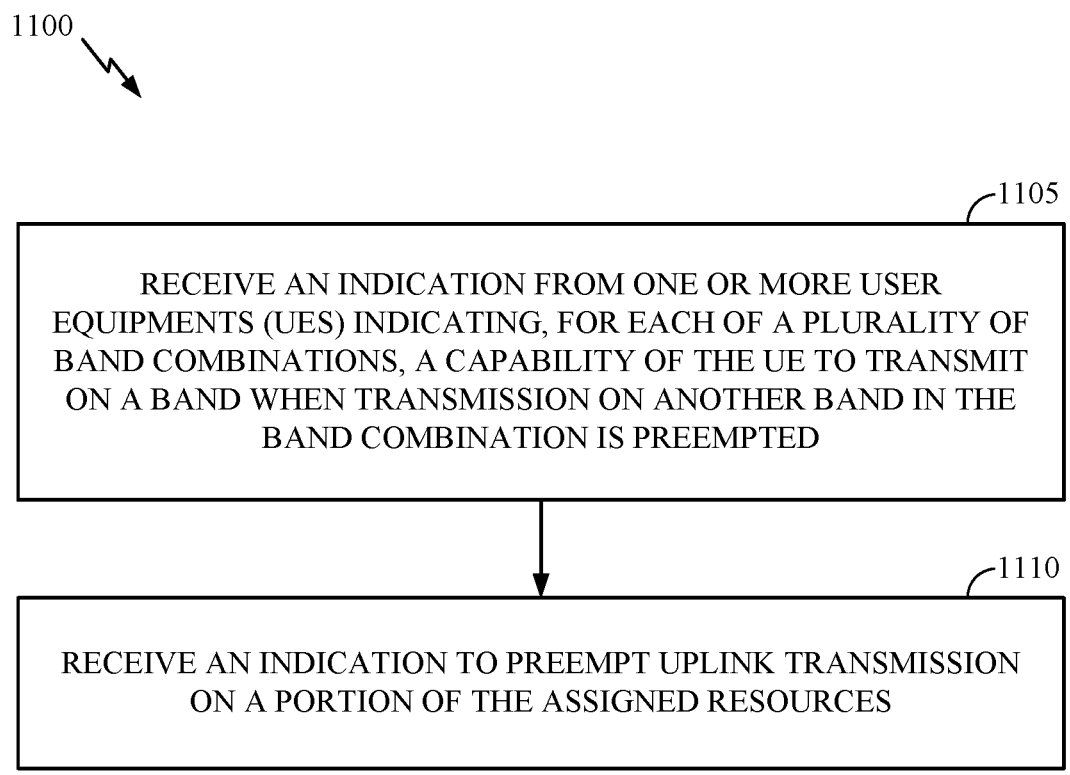
FIG. 11 is a flow diagram illustrating example operations for wireless communications by a receiving device, in accordance with aspects of the present disclosure.

FIG. 11 illustrates example operations 1100 for wireless communications by a BS (e.g., such as a BS 110 in the wireless communication network 100 which may be a gNB), in accordance with aspects of the present disclosure. Operations 1100 may be complementary operations by the BS to the operations 1000 by the UE. Operations 1100 may be implemented as software components that are executed and run on one or more processors (e.g., processor 440 of FIG. 4). Further, the transmission and reception of signals by the BS in operations 1100 may be enabled, for example, by one or more antennas (e.g., antennas 434 of FIG. 4). In certain aspects, the transmission and/or reception of signals by the BS may be implemented via a bus interface of one or more processors (e.g., processor 440) obtaining and/or outputting signals.

Operations 1100 begin, at 1105, by receiving an indication from one or more UEs indicating, for each of a plurality of band combinations, a capability of the UE to transmit on a band when transmission on another band in the band combination is preempted. At 1105, the BS schedules the one or more UEs for uplink transmission based on the indication.

Figure 12:
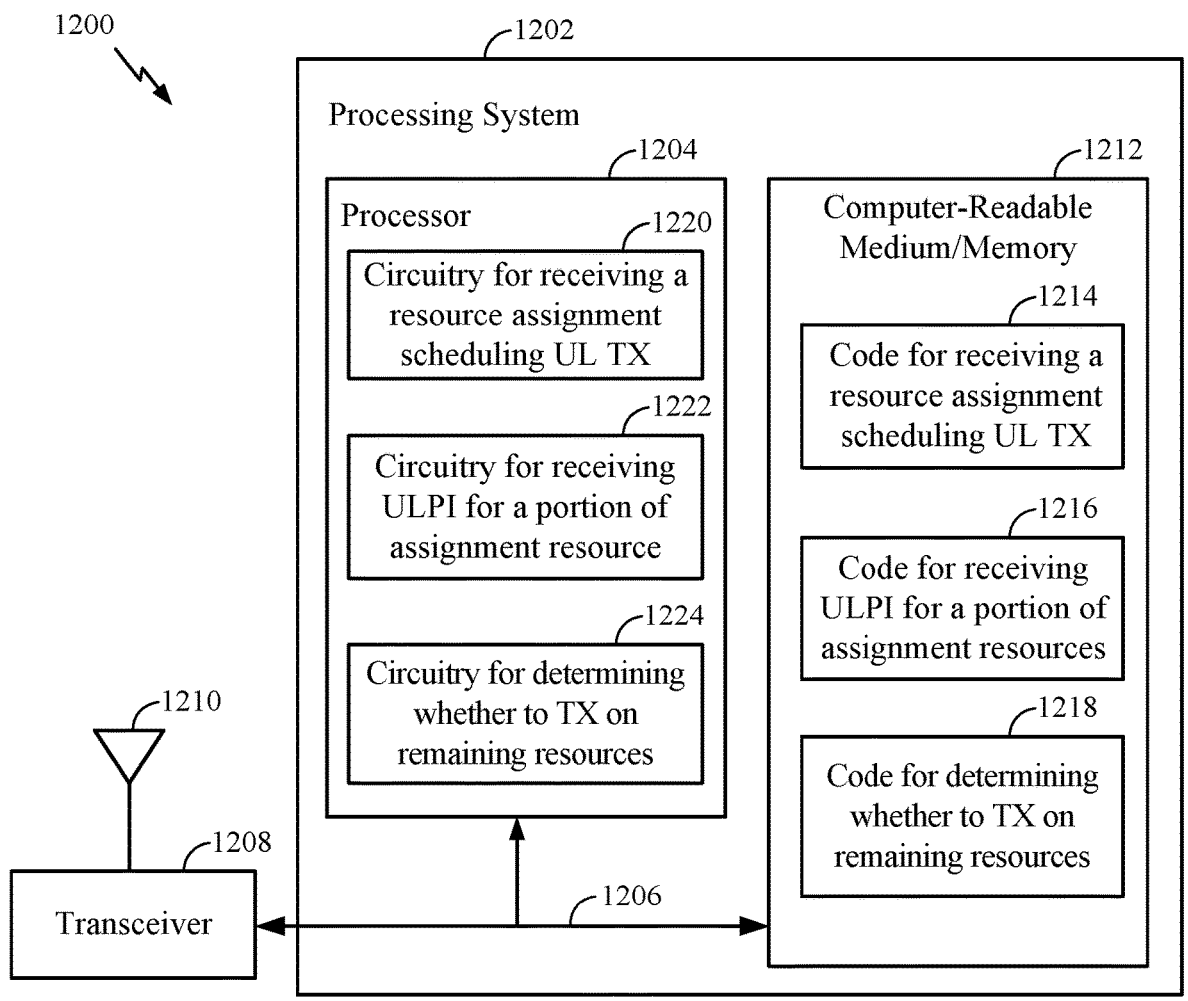
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1002 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for uplink preemption in CA or multi-connectivity modes. In certain aspects, computer-readable medium/memory 1212 stores code 1214 for receiving a resource assignment scheduling the UE for uplink transmission; code 1216 for receiving an indication to preempt uplink transmission on a portion of the assigned resources; and code 1218 for determining whether to transmit on the remaining assigned resources. In certain aspects, the processor 1204 has circuitry configured to implement the code stored in the computer-readable medium/memory 1212. The processor 1204 includes circuitry 1220 for receiving a resource assignment scheduling the UE for uplink transmission; circuitry 1222 for receiving an indication to preempt uplink transmission on a portion of the assigned resources; and circuitry 1224 for determining whether to transmit on the remaining assigned resources.

Figure 13:
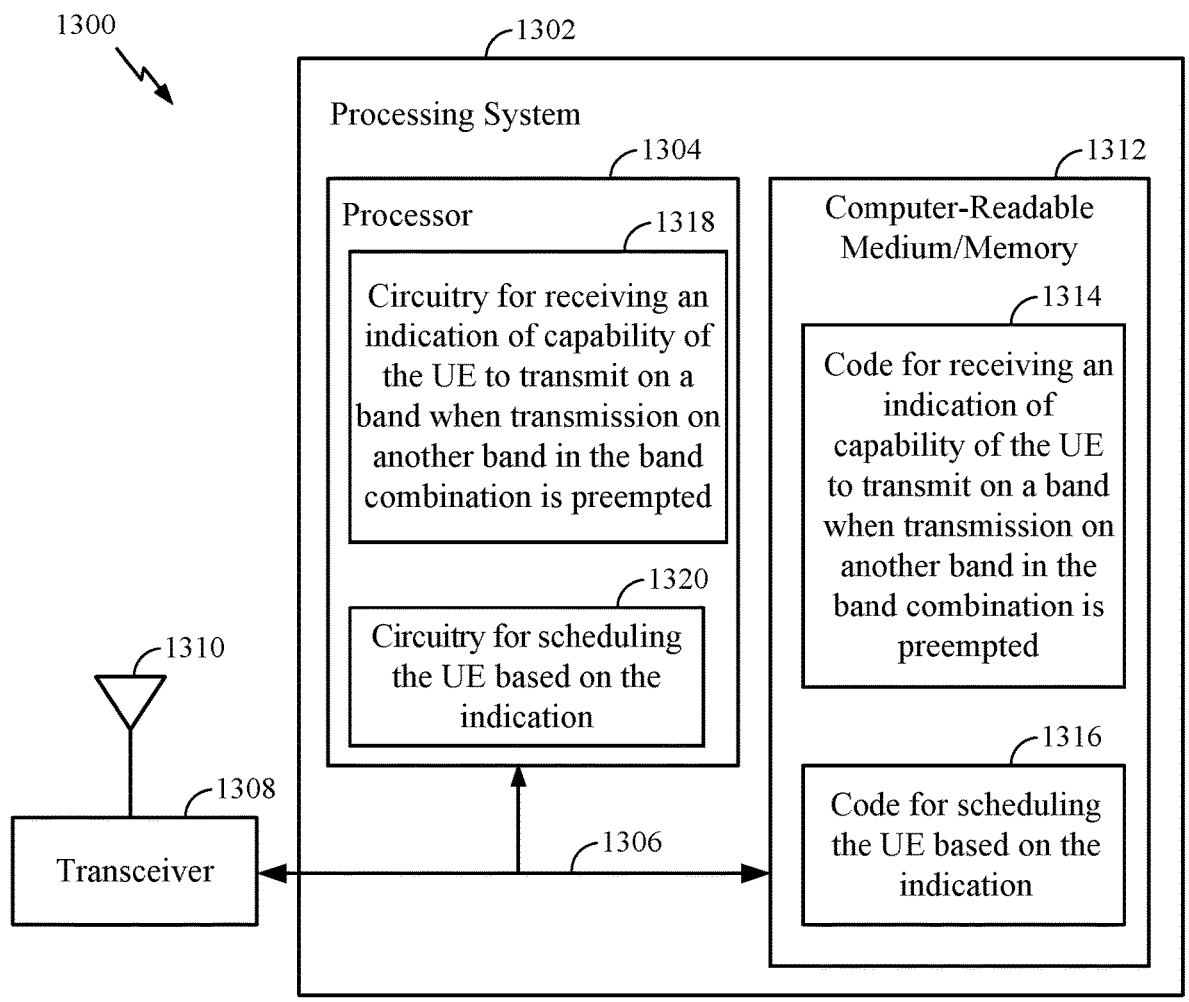
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein for uplink preemption in CA or multi-connectivity modes. In certain aspects, computer-readable medium/memory 1212 stores code 1314 for receiving an indication from one or more UEs indicating, for each of a plurality of band combinations, a capability of the UE to transmit on a band when transmission on another band in the band combination is preempted; and code 1316 scheduling the one or more UEs for uplink transmission based on the indication. In certain aspects, the processor 1304 has circuitry configured to implement the code stored in the computer-readable medium/memory 1312. The processor 1304 includes circuitry 1318 for receiving an indication from one or more UEs indicating, for each of a plurality of band combinations, a capability of the UE to transmit on a band when transmission on another band in the band combination is preempted; and circuitry 1320 scheduling the one or more UEs for uplink transmission based on the indication.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 10 and/or FIG. 11

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
providing an indication to a base station (BS) of a capability of the UE to transmit on other component carriers (CCs) when a CC is preempted;
receiving, from the base station, a resource assignment scheduling the UE for uplink transmission;
receiving, from the base station, an indication to preempt uplink transmission on a portion of the assigned resources comprising at least one symbol and at least one component carrier (CC); and
determining whether to transmit on the remaining assigned resources comprising at least one of: other symbols subsequent the at least one symbol or other CCs than the at least one CC.

2. The method of claim 1, further comprising preempting transmission on the portion of the assigned resources by dropping uplink transmission in the portion of the assigned resources.

3. The method of claim 1, further comprising sending or dropping uplink transmission on the remaining assigned resources based on the determination.

4. The method of claim 1, wherein the determination is based on a type of content of the other symbols.

5. The method of claim 4, wherein the type of content comprises at least one of: a demodulation reference signal (DMRS), uplink control information (UCI), or a type of UCI.

6. The method of claim 4, wherein the determination comprises determining to send uplink transmission on each of the at least one CC and the other CCs in the other symbols when the type of content is transmitted on that CC in one of the other symbols.

7. The method of claim 4, wherein the determination comprises determining to send uplink transmission on both the at least one CC and the other CCs in the other symbols when the type of content is transmitted in the other CCs in one of the other symbols.

8. The method of claim 7, wherein:
the type of content is not transmitted in the at least one CC in one of the other symbols, and
phase continuity will not be maintained.

9. A method for wireless communications by a user equipment (UE), comprising:
receiving a resource assignment scheduling the UE for uplink transmission;
receiving an indication to preempt uplink transmission on a portion of the assigned resources comprising at least one symbol and at least one component carrier (CC);
determining whether to transmit on the remaining assigned resources comprising at least one of: other symbols subsequent the at least one symbol or other CCs than the at least one CC;
wherein the determination is based on whether phase continuity will be maintained between the CCs after the preemption.

10. The method of claim 9, wherein the determination comprises determining to send uplink transmission on the at least one CC and the other CCs in the other symbols when phase continuity will be maintained on at least one CC and the other CCs after the preemption.

11. The method of claim 9, wherein the determination comprises determining to send or drop uplink transmission on the at least one CC and the other CCs in the other symbols when phase continuity will be maintained on only some of the CCs after the preemption.

12. A method for wireless communications by a user equipment (UE), comprising:
receiving a resource assignment scheduling the UE for uplink transmission;
receiving an indication to preempt uplink transmission on a portion of the assigned resources comprising at least one symbol and at least one component carrier (CC);
determining whether to transmit on the remaining assigned resources comprising at least one of: other symbols subsequent the at least one symbol or other CCs than the at least one CC, wherein the determination is based on at least one of: whether the at least one CC and the other CCs are inter-band or intra-band or whether the at least one CC and the other CCs are frequency contiguous or frequency non-contiguous.

13. The method of claim 12, wherein the determination comprises determining to drop uplink transmission in the at least one symbol on another CC when the at least one CC and the other CC are intra-band and frequency contiguous.

14. The method of claim 12, wherein the determination comprises determining to send uplink transmission in the at least one symbol on the other CCs when the at least one CC and the other CCs are frequency non-contiguous.

15. A method for wireless communication by a base station (BS), comprising:
receiving an indication from a user equipment (UE) indicating a capability of the UE to transmit on other component carriers (CCs) when transmission on a CC is preempted;
and
scheduling the UE for uplink transmission based on the indication comprising:
transmitting, to the UE, a resource assignment scheduling the UE for uplink transmission;
transmitting, to the UE, an indication to preempt uplink transmission on a portion of assigned resources comprising at least one symbol and at least one component carrier (CC); and
receiving uplink transmission from the UE via the remaining assigned resources comprising at least one of: other symbols subsequent the at least one symbol or other CCs than the at least one CC.

16. An apparatus for wireless communications, comprising:
means for providing an indication to another apparatus of a capability of the apparatus to transmit on other component carriers (CCs) when a CC is preempted;
means for receiving a resource assignment scheduling the apparatus for uplink transmission;

means for receiving an indication to preempt uplink transmission on a portion of the assigned resources comprising at least one symbol and at least one component carrier (CC); and means for determining whether to transmit on the remaining assigned resources comprising at least one of: other symbols subsequent the at least one symbol or other CCs than the at least one CC.

17. The apparatus of claim 16, further comprising means for preempting transmission on the portion of the assigned resources by dropping uplink transmission in the portion of the assigned resources.

18. The apparatus of claim 16, further comprising means for sending or dropping uplink transmission on the remaining assigned resources based on the determination.

19. The apparatus of claim 16, wherein the determination is based on a type of content of the other symbols.

20. An apparatus for wireless communications, comprising:

means for receiving a resource assignment scheduling the apparatus for uplink transmission;

means for receiving an indication to preempt uplink transmission on a portion of the assigned resources comprising at least one symbol and at least one component carrier (CC); and means for determining whether to transmit on the remaining assigned resources comprising at least one of: other symbols subsequent the at least one symbol or other CCs than the at least one CC, wherein the determination is based on whether phase continuity will be maintained between the CCs after the preemption.

21. The apparatus of claim 20, wherein the determination comprises determining to send uplink transmission on the at least one CC and the other CCs in the other symbols when phase continuity will be maintained on at least one CC and the other CCs after the preemption.

22. The apparatus of claim 20, wherein the determination comprises determining to send or drop uplink transmission on the at least one CC and the other CCs in the other symbols when phase continuity will be maintained on only some of the CCs after the preemption.

23. An apparatus for wireless communications, comprising:

means for receiving a resource assignment scheduling the apparatus for uplink transmission;

means for receiving an indication to preempt uplink transmission on a portion of the assigned resources comprising at least one symbol and at least one component carrier (CC); and means for determining whether to transmit on the remaining assigned resources comprising at least one of: other symbols subsequent the at least one symbol or other CCs than the at least one CC, wherein the determination is based on at least one of: whether the at least one CC and the other CCs are inter-band or intra-band or whether the at least one CC and the other CCs are frequency contiguous or frequency non-contiguous.

24. The apparatus of claim 23, wherein the determination comprises determining to drop uplink transmission in the at least one symbol on another CC when the at least one CC and the other CC are intra-band and frequency contiguous.

25. The apparatus of claim 23, wherein the determination comprises determining to send uplink transmission in the at least one symbol on the other CCs when the at least one CC and the other CCs are frequency non-contiguous.

26. An apparatus for wireless communication, comprising:

means for receiving an indication from another apparatus indicating a capability of the another apparatus to transmit on other component carriers (CCs) when transmission on a CC is preempted; and means for scheduling the another apparatus for uplink transmission based on the indication, comprising:

means for transmitting, to the another apparatus, a resource assignment scheduling the another apparatus for uplink transmission;

means for transmitting, to the another apparatus, an indication to preempt uplink transmission on a portion of assigned resources comprising at least one symbol and at least one component carrier (CC); and means for receiving uplink transmission from the another apparatus via the remaining assigned resources comprising at least one of: other symbols subsequent the at least one symbol or other CCs than the at least one CC.

* * * * *